CONVERSION SYSTEM

Filed June 6, 1961

INVENTORS
HOWARD L. FUNK
THOMAS J. HARRISON
JAMES JURSIK
BY [signature]
ATTORNEY

REGISTER

| 8 | 4 | 2 | 1 | 8 | 4 | 2 | 1 | TEST |
|---|---|---|---|---|---|---|---|---|
| 1 | 0 | 0 | 0 | 0 | 0 | 0 | 0 | HI |
| 0 | 1 | 0 | 0 | 0 | 0 | 0 | 0 | LO |
| 0 | 1 | 1 | 0 | 0 | 0 | 0 | 0 | HI |
| 0 | 1 | 0 | 1 | 0 | 0 | 0 | 0 | LO |
| 0 | 1 | 0 | 1 | 1 | 0 | 0 | 0 | HI |
| 0 | 1 | 0 | 1 | 0 | 1 | 0 | 0 | HI |
| 0 | 1 | 0 | 1 | 0 | 0 | 1 | 0 | LO |
| 0 | 1 | 0 | 1 | 0 | 0 | 1 | 1 | HI |
| 0 | 1 | 0 | 1 | 0 | 0 | 1 | 0 | FINISH |
| 5 | | | | 2 | | | | |

United States Patent Office 3,216,003
Patented Nov. 2, 1965

3,216,003

CONVERSION SYSTEM

Howard L. Funk, Yorktown Heights, N.Y., and Thomas J. Harrison, San Jose, and James Jursik, Los Gatos, Calif., assignors to International Business Machines Corporation, New York, N.Y., a corporation of New York Filed June 6, 1961, Ser. No. 115,113
12 Claims. (Cl. 340—347)

This invention relates to a conversion system and more particularly to an improved analog-to-digital conversion system primarily adaptable to convert low level analog signals to digital form without preamplification of the low level analog signals.

In most large scale information handling systems, data is normally obtained in an analog form and, generally, this analog data is converted into an electrical representation, that is, the instantaneous value of the magnitude of each analog datum is converted into a variation in the magnitude of a particular electrical quantity. In this manner, the variation of such measurable quantities as temperature, pressures, flow rates, and the like, are converted, by means of conventional transducers, into corresponding variations of electrical voltages, frequencies, and the like; these electrical variations are then employed to actuate indicating devices such as meters and recorders. Recently, however, a problem has arisen in handling and assembling this analog information as a result of the increase in the number of information analog signals being monitored. An obvious solution to this problem is to employ an electronic computer adaptable to accurately and rapidly process the input information so as to produce the desired composite information. By way of example, when a few sources of information are being monitored, the analog information is directly recorded in graphic form, and an operator thereafter selectively combines this graphic information into a composite form, such as curves or tables, which indicates the resultant desired information. As the number of analog sources are increased, a computer is advantageously employed to selectively operate, in combination with the various information sources, to produce one or more output graphs or tables, which indicate the desired composite information.

Computers are broadly classified in the prior art into two groups, generally known as either analog or digital computers. Analog computers are effective to accept information in analog form and, by means of further analog operations, convert this information into useable analog outputs. However, as the number of analog operations increases, the overall accuracy of the output analog information decreases since, as is well known, first the analog representation of each of the input informations has a particular tolerance and, further, each analog operation includes an additional tolerance. Thus, when a large number of analog operations are necessary to convert the analog information into the desired output form, the magnitude of the error in the ouput as a result of cascading these tolerances is substantially increased. Digital computers, however, are characterized by an accuracy which is relatively independent of the number of digital operations performed on the input data, and, further, digital computers generally exhibit greater speed capabilities. For this reason, in large scale information handling systems, it is generally desirable to first convert the analog information to digital form, process the assimilated information in a digital computer, and finally provide the required output information in either analog or digital form. The connection of a digital computer to analog information sources, therefore, requires one or more systems effective to convert analog information into digital form and, for operational requirements combined with economic considerations, it is desirable to time share a single analog-to-digital converter. This unit is then effective to convert each of the analog information signals into digital form in a predetermined sequence, to provide the information in digital form as required by the computer.

According to this invention, there is provided an improved analog-to-digital converter which is particularly adaptable to large scale information handling systems wherein a single analog-to-digital converter is employed to convert a number of analog input signals into digital form as required by either the computer to which the signals may thereafter be delivered, or alternatively, to one or more particular output indicators. It should be noted that analog-to-digital converters according to the prior art may be broadly classified into two general types. The first, known as the analog shaft to digital encoder, provides a particular digital representation as a function of the analog signal applied to a servomotor, or the like, which is effective to cause a predetermined rotation of the shaft of the servomotor. The second broad class of analog-to-digital converters, known as the electronic type, convert an analog signal, represented by a voltage or frequency, directly into digital output form without the use of rotating machinery. This latter class may further be grouped into two subclasses. The first, or ramp type, includes means for initiating the start of a time sampling period which is effective to both generate a sequence of pulses as well as to initiate the start of a linear saw tooth, or ramp, function. This saw tooth waveform is supplied, together with the voltage analog input signal, to a comparison unit. The comparison unit is effective to generate an output indication at the time the magnitude of the generated linear ramp function is equal to the magnitude of the unknown analog input signal, the indication being effective to terminate the generation of the pulses. The number of pulses generated is indicative of the magnitude of the analog input signal. The second subclass directly compares the unknown analog input signal with a generated comparison analog signal, the difference between the magnitude of these signals, if any, is used to correct the magnitude of the comparison analog signal until equality between these signals is attained. Further, the comparison analog signal is normally generated from the output of a digital register such that when this analog comparison signal is equal to the unknown analog signal, the register stores the digital representation thereof. It is to this latter subclass that the particular analog-to-digial converter of the invention is directed. Broadly, the analog-to-digital converter of the invention provides an improved low level comparison means between the unknown analog and comparison analog signals effective to generate an error signal which corrects the magnitude of the analog comparison signal. Further, by means of a number of improved and novel circuit designs, it is not necessary to provide a low level, low noise, highly stable amplifier to convert the low level input signal to a useful comparison level, rather the comparison is performed without preamplification. Further, the analog-to-digital converter of this invention is readily adaptable to accept either positive or negative analog input signals, and, further, can accept such signals over a wide range of input levels without disturbing the operation of the converter. Moreover, a novel shielding arrangement is employed in the low level circuits of the converter to obtain increased rejection to both A.C. and D.C. common mode interference. Common mode interference is defined as the voltage appearing on both input signal lines as a result of ground loop and other error signals. This common mode voltage is generally greater than the normal mode voltage generated by the analog transducer, when the latter is situated at a location remote from the analog-to-digital converter. By properly maintaining the low level circuitry relatively independent of the system ground, and, further, by maintaining a relatively high value of input impedance to both the A.C. and D.C. components of the input signals, even when the comparison analog signal is markedly different from the unknown analog signal, precise conversion of analog signals in the millivolt range is possible in the presence of common mode voltages in the range of volts. Additionally, when a large error signal is generated in the comparison of the two analog signals, overload of the pulse amplifier resulting in overshoot signals produced at the output thereof is minimized by means of a novel decision logic circuit which accepts only the true component of the amplifier output. Basically, the converter operates through a number of comparison cycles. The first half of each cycle includes the series connection of a known comparison analog signal and the unknown analog signal, the difference between these signals being amplified as to polarity and magnitude to correct the comparison signal according to a predetermined logical program during the second half of each comparison cycle.

It is an object of the invention to provide an improved analog-to-digital converter.

Another object of the invention is to provide an improved low level analog-to-digital converter.

Still another object of the invention is to provide a low level analog-to-digital converter without preamplfication.

Yet another object of the invention is to provide a low level analog-to-digital converter which is rapidly adaptable to service and sequence a number of wide range analog input signals.

A further object of the invention is to provide an improved bipolar analog-to-digital converter.

Still another object of the invention is to provide a low level analog-to-digital converter which accepts a wide range of input signals.

Yet another object of the invention is to provide an analog-to-digital converter which includes a range select network which does not alter the gain in a feedback loop of the high stability amplifier.

A still further object of the invention is to provide a novel comparison circuit in an analog-to-digital converter.

Another object of the invention is to provide an analog-to-digital converter which does not load down the analog input circuit during the time the digital output is being determined.

The foregoing and other objects, features and advantages of the invention will be apparent from the following more particular description of a preferred embodiment of the invention, as illustrated in the accompanying drawings.

Figure 1:
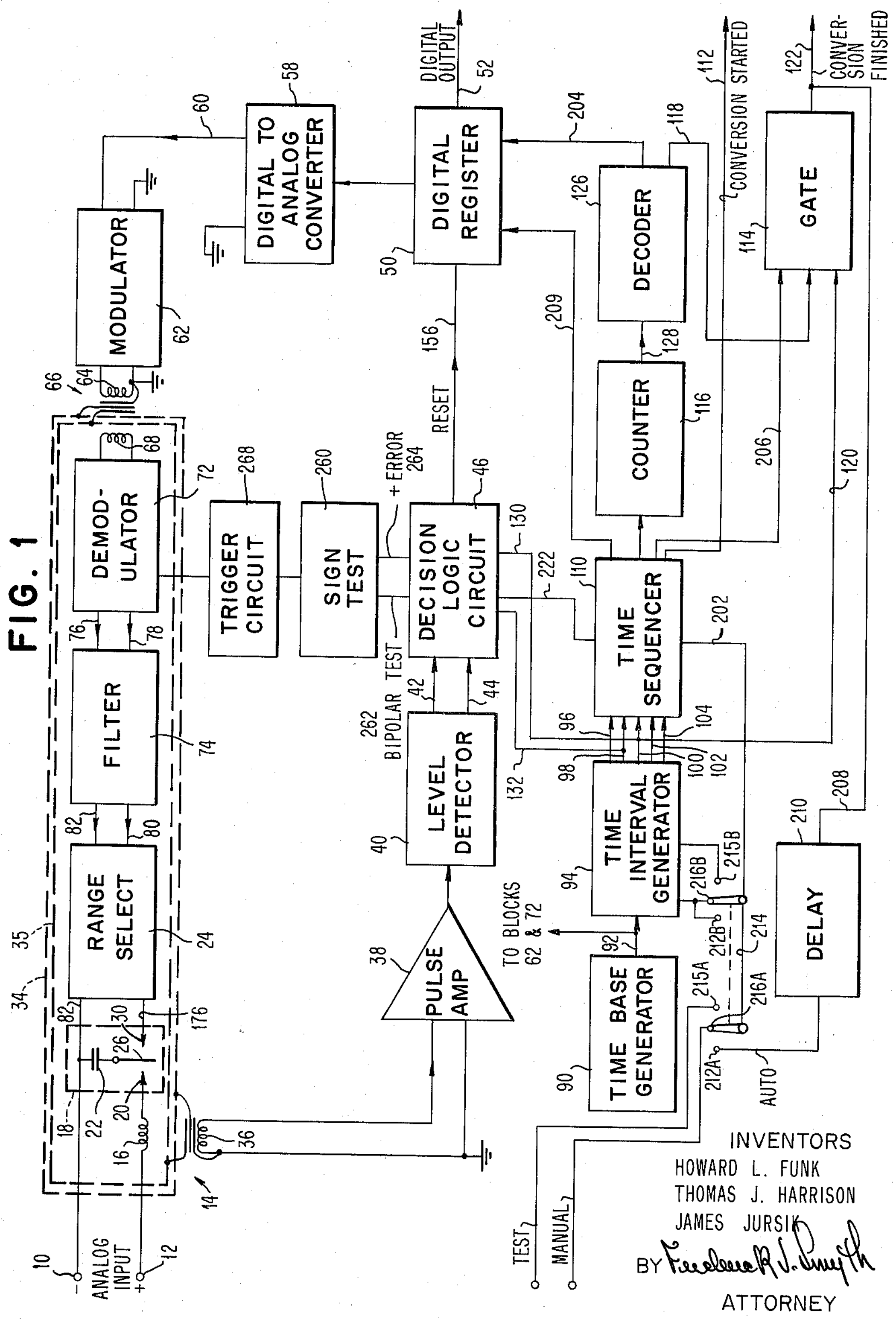
FIG. 1 is a block diagram of the analog-to-digital converter of the invention.

Referring now to the drawings, FIG. 1 illustrates, in block diagram form, the analog-to-digital converter of the invention. As shown, the unknown analog input signal is supplied to a pair of terminals 10 and 12, wherein terminal 12 is designated as the positive terminal. However, as will be understood as the description proceeds, bipolar signals also can be applied to terminals 10 and 12 to obtain the digital representation thereof. Terminals 10 and 12 normally open circuited, are selectively connected in series with primary winding 16 of a transformer 14 and capacitor 22, through the switching action of a chopper 18. Switching contact 26 of chopper 18, coupled to capacitor 22, connects this capacitor to a contact 20 connected to primary winding 16, to thereby connect the potential applied to capacitor 22 in series with the input analog signal. The analog input voltage in conjunction with a predetermined potential coupled to capacitor 22 is effective to generate an error signal, as will be more particularly described hereinafter. Briefly, a known, analog voltage is supplied to a terminal 30 of chopper 18 by means of a range select network 24. Upon switching contact 26 of chopper 18 connecting with terminal 30, capacitor 22 is charged to the potential at the output of the range select network 24. Next, as a result of chopper action, the known potential applied to capacitor 22 is connected in series with the unknown analog voltage supplied to terminals 10 and 12 at the time switching contact 26 connects capacitor 22 to terminal 20. The difference in the potential, if any, of capacitor 22, and the analog input signal supplied to terminals 10 and 12, create a momentary pulse of current through primary winding 16 of transformer 14. This pulse of current, by transformer action, is coupled through the doubly shielded input circuit, indicated generally as 34 and 35, to secondary winding 36 of transformer 14. The pulse of voltage induced in secondary winding 36 is coupled to a pulse amplifier 38 and is amplified therein to any convenient level. The output of amplifier 38 is directed to a level detector 40 which is effective to generate a positive error indication should the output of amplifier 38 exceed a predetermined positive threshold or generate a negative error indication, should the output of amplifier 38 exceed in a negative direction a second predetermined threshold level. Level detector 40 is employed to improve the signal to noise ratio at the output of amplifier 38 by responding only to signals which exceed predetermined thresholds. Further, the signal to noise ratio is improved in detector 40 by employing regenerative amplification through the use of, by way of example, such well known devices as blocking oscillators. As will be more particularly discussed hereinafter, pulse amplifier 38 may be momentarily overloaded when switching contact 26 of chopper 18 contacts terminal 20. This results when the known comparison voltage is greatly different from the unknown analog signal and thus generates a relatively large input pulse which is coupled to amplifier 38 by transformer 14. Under these conditions, a pulse waveform having a significant magnitude of overshoot attached thereto is delivered to level detector 40 sufficient to energize both positive and negative error indications. The indications are coupled by a pair of lines 42 and 44 to a decision logic circuit 46. The function of circuit 46 is to determine, upon receiving both positive and negative error signals from detector 40, the first occurring of these signals, and, simultaneously, reject the second of these signals as merely a result of the momentary overload of amplifier 38. As further discussed hereinafter, detector 46 is actuated by the first of possibly two arriving signals to control the setting of a digital register shown in block form in FIG. 1 by reference numeral 50. The digital register may contain information in any convenient digital form such as binary code, binary coded decimal, or the like. Register 50 may be initially set at the time a conversion operation commences to represent digital zero, or, alternatively, the maximum indication storable in the register, and detector 46 is effective sequentially upon each comparison to direct register 50 to progress to the digital representation of the unknown analog input signal. Further, in a more sophisticated approach which will be more particularly described as the discussion proceeds, register 50 can be initially adjusted to a predetermined value, the signal from detector 46 together with a logical program thereafter being effective to step register 50 in logical steps to more rapidly arrive at the manifestation corresponding to the magnitude of the unknown analog input signal. Register 50 supplies the digital representation output along a line 52, which, in conjunction with a conversion finish line 122, indicates that the register is storing the digital value corresponding to the magnitude of the analog signal applied at the input terminals of the converter.

During the cycle of operations wherein register 50 is being adjusted to approach the value of the analog input signal under control of detector 46, the digital value stored in register 50 is converted to analog form by means of the digital-to-analog converter 58 coupled thereto. Converter 58 is operable to convert the digital information of register 50 into a specific magnitude of voltage corresponding to the information stored in register 50. Since the input circuit of the analog-to-digital converter of the invention is essentially floating with respect to any reference potential, it is necessary to convert the voltage generated by converter 58 to a voltage having the equivalent magnitude which is also floating with respect to any reference potential so that a comparison between the converted voltage and the analog input voltage may be obtained. For this reason the voltage developed by converter 58 is coupled along a line 60 to a modulator 62. Modulator 62, which may be any of the well known D.C. to A.C. converters is effective to convert the magnitude of voltage supplied by line 60 into a corresponding magnitude of A.C. potential coupled to a primary winding 64 of transformer 66. This A.C. potential appearing across winding 64 is transformer coupled through shields 34 and 35 to a secondary winding 68 of transformer 66. This transformer coupled A.C. voltage is next demodulated to essentially a D.C. potential equal in magnitude to the potential developed by converter 58 by demodulator 72. Resulting from the fact that the output of demodulator 72 is not a pure D.C. voltage, a filter section 74 is effective to convert the output of demodulator 72 into the necessary D.C. voltage for use in the input comparison circuit. Further, in view of the particular timing operations described in detail hereinafter, it is necessary that filter 74 be designed, such that harmonics resulting from the various timing pulses which synchronize the operation of the converter do not influence the magnitude of the known analog voltage delivered to the comparison network. Thus the output of demodulator 72 is coupled by a pair of lines 76 and 78 to filter 74 and thence the filtered output is coupled by a pair of lines 80 and 82 to range select network 24. Range select network 24, in conjunction with capacitor 22, is further effective in a novel manner to provide additional filtering to the output signal of demodulator 72. Range select network 24 is adjustable at the start of a conversion operation to insure proper conversion of the unknown analog input signal, independent of its particular magnitude. Thus, when switching contact 26 of chopper 18 dwells on contact 30, capacitor 22 is charged to the magnitude of the comparison voltage appearing at the output range select network 24. Upon the transfer of switching contact 26 to contact 20, this feedback potential is connected in series with the analog input signal applied to terminals 10 and 12, and, should this potential be different from the magnitude of the analog input signal, another pulse is generated through primary winding 16 of transformer 14, which is coupled to pulse amplifier 38 and a further correction continues.

In order to synchronize the various operations within the analog-to-digital converter shown in FIG. 1, a time base generator 90 is employed to generate a reference timing signal. The output of generator 90 is effective to actuate modulator 62 and demodulator 72 and also is coupled along a line 92 to a time interval generator 94. Generator 94 develops a number of timing pulses along a series of lines indicated, by way of example, by lines 96 through 104, which are coupled to particular circuits, as well as coupled to a time sequencer 110. Time sequencer 110 is first effective to energize a line 112 which indicates that a conversion operation has begun. Further, an output of time sequencer 110 is also fed to a gate circuit 114 to which also are fed an impulse from a counter 116, along a line 118, as well as a pulse from generator 94 along a line 120, to activate gate 114. Energization of gate 114 then indicates that a conversion operation is finished by delivering an output manifestation along a line 122. Additionally, it should be noted that a counter 116 is additionally energized by an output from sequencer 110, and is effective to deliver, to a decoder 126, an input signal along a line 128 to control the operation of register 50 as more particularly described below. It should also be noted that additional outputs are also obtained from generator 94 prior to being delivered to a sequencer 110 as indicated by way of example, lines 130 and 132 coupled to logic circuit 46. For a more particular description of the operation of each of the blocks indicated in FIG. 1, reference should be made to the detailed description below, wherein a particular sequence of operations is more particularly described.

Figure 2:
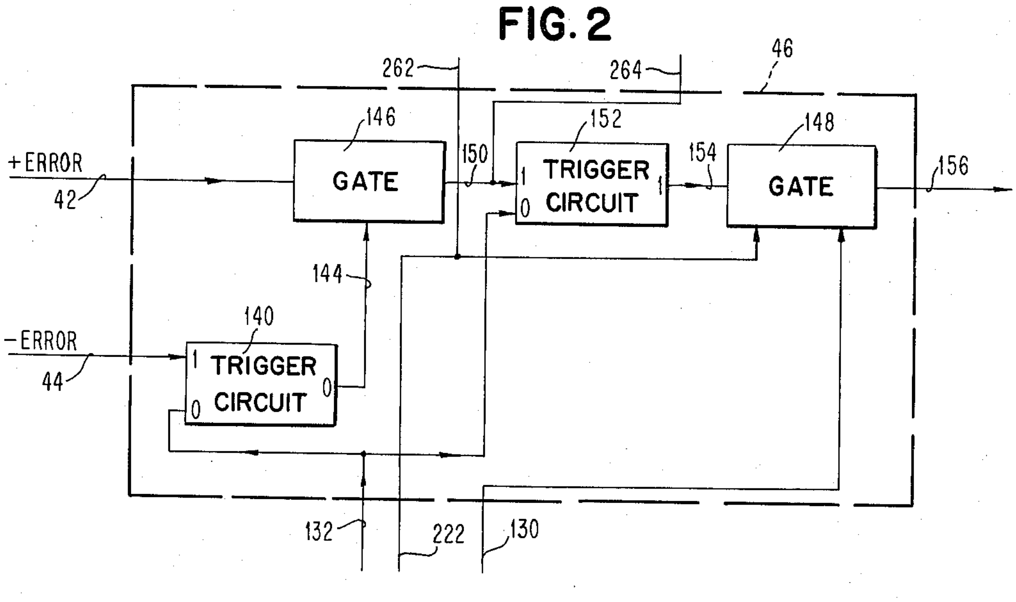
FIG. 2 is a further block diagram of the error detector of the analog-to-digital converter of the invention.

Before proceeding with the detailed operation analysis of the circuit of FIG. 1, various components illustrated therein are first more particularly described. Referring first to FIG. 2, there is illustrated a more complete block diagram of decision logic circuit 46 of FIG. 1. As shown in FIG. 2, the positive error signal is coupled to decision logic circuit 46 along line 42 and the negative error signal is coupled to logic circuit 46 along line 44. Generally, one or the other of these lines are energized by level detector 40 as a result of the signal delivered by amplifier 38 of FIG. 1. However, upon the occurrence of an overload condition in amplifier 38 it is possible to obtain a bipolar pair of error signals from amplifier 38 which exceed the threshold levels set up in detector 40 (see FIG. 1). Thus, it is necessary to determine the polarity of the signal which arrives first in time along either lines 42 or 44. A timing impulse supplied by time interval generator 94 is first delivered along a line 132 to logic circuit 46, as is more particularly described hereinafter with reference to the time sequence of operations of the analog-to-digital converter. This timing impulse supplied by line 132, is effective to reset a trigger circuit 140 of logic circuit 46 to the OFF or zero output condition so that an output line 144 thereof is activated. Activation of line 144 sets a gate circuit 146 to the ON state. The impulse applied by line 132 is also effective to reset a trigger circuit 152, of logic circuit 46, to the OFF condition. At this time, error signals from detector 40 are delivered along either or both of lines 42 and 44. Considering next the case where a positive error signal only is coupled to logic circuit 46 along line 42, this signal, arriving at gate 146, is passed therethrough since the reset pulse coupled by line 132 has conditioned trigger circuit 140 to open gate 146. Thus, the positive error signal is coupled through gate 146 and along a line 150 to trigger circuit 152. The pulse supplied by line 150 is effective to set trigger circuit 152 to the ON condition and generate an output indication which appears on a line 154. A subsequent timing pulse from time interval generator 94, coupled along a line 130 is next effective to open a gate 148 to couple the output appearing on line 154 to register 50 along a line 156. The next pulse along line 132, prior to the next comparison, then resets logic circuit 46 to the quiescent state with trigger 140 holding open gate 146 and trigger 152 reset to the OFF condition. Conversely, should a negative error signal only be received from level detector 40, logic circuit 46 operates in an alternate manner. First the impulse coupled to the logic circuit along line 132 again is effective to set trigger circuit 140 to the OFF condition to open gate 146. However the negative error signal thereafter applied to trigger circuit 140 switches the state of this circuit, de-energizing line 144 and closing gate 146. Thus, upon the receipt of a negative error signal, first in time, between timing pulses 132 and 130, the presence or absence thereafter of a positive error signal along line 42 is ineffective to supply an output signal along output line 156 as a result of the closure of gate circuit 146. Subsequent to the receipt of either or both of these error signals as described above, a timing pulse along line 130 momentarily opens gate 148 to allow the output of trigger 152, if any, to flow to register 50. In this manner, logic circuit 46 is effective to deliver an output along line 156 only when a positive error signal is delivered along line 42 either by itself or immediately prior to the reception of a negative error signal along line 44. The prior occurrence of a negative error signal is effective to deactivate logic circuit 46 during each comparison time interval between the impulses applied along line 132, indicating that the comparison analog signal was less than the unknown analog signal as will be better understood from the detailed examples to follow.

Figure 3:
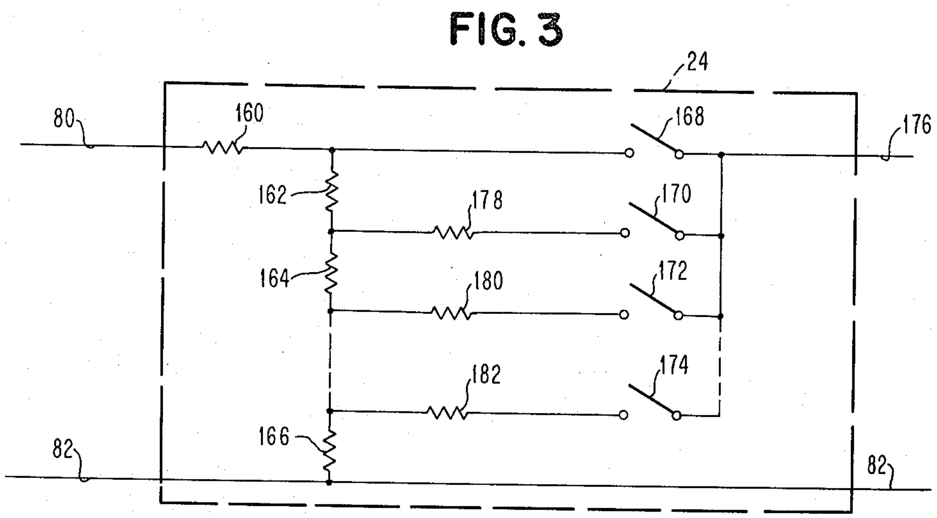
FIG. 3 is a further block diagram of the range select network of the analog-to-digital converter of the invention.

FIG. 3 illustrates in elementary form a schematic diagram of range select network 24. The filtered demodulated analog comparison signal, the magnitude of which is determined by the digital-to-analog converter 58, is coupled along lines 80 and 82 to network 24. Thereafter all or a portion of this analog voltage is coupled to one terminal of capacitor 22 and terminal 30 of chopper 18. Further, it should be noted that, since the analog output voltage of network 24 is coupled in parallel with capacitor 22, the resistance network of range select network 24 uniquely provides additional filtering of the known analog signal. This is accomplished by a number of filter resistors, the first 160 being in series with line 80 and a group of resistors, indicated as 162, 164, and 166, being connected in series between input lines 80 and 82 and effectively in parallel with capacitor 22 should the full analog voltage supplied between lines 80 and 82 be applied thereto. This voltage is applied by selectively closing a relay armature 168 to directly connect the terminal end of resistor 160 to terminal 30 along a line 176. Should a lesser known analog signal be desired, selective closure of contacts 170, 172, or 174 is effective to deliver along line 176 a portion of the signal applied to input line 80. Further to maintain the desired RC filtering action, resistors 178, 180, and 182 are connected in series with each selected relay contact 170, 172, and 174 respectively. It should be noted at this time, that range select network 24 is effective to change the conversion range of the analog-to-digital converter shown in FIG. 1 without either changing the gain of a precision amplifier or altering a feedback network in a high stability amplifier. This latter point is of extreme importance since, in changing the magnitude of the feedback voltage in a high stability amplifier, it is necessary to essentially open the feedback circuit momentarily which normally causes the amplifier to be heavily overloaded. This results from the fact that the open circuit gain of most high stability amplifiers is extremely high when the feedback circuit is not coupled between the output and input terminals thereof, and noise generated in the input circuit of such amplifiers is generally sufficient, by itself, to cause overloading.

Before describing, in detail, the features of the various circuits generally indicated in the block diagram of FIG. 1 and the advantages provided thereby, a typical sequence of operations is next described. Further, in describing the sequence of operations a particular logic program will be assumed, it being understood that other logical programs can be employed without departing from the scope of this invention. First, the register is conditioned to perform sequentially a trial and error correction scheme in a binary decimal coded representation. In this code, each significant figure is represented in binary notation through the summation of four binary bits corresponding to the decimal values 8, 4, 2, and 1. Thus the combination of a binary 1 in the 8 position and a binary 1 in the 1 position corresponds to a decimal value of 9; a binary 1 in the 8 position only represents the decimal value of 8; a binary 1 in the 4, 2, and 1 positions corresponds to a decimal value of 7; a binary 1 in the 4 and 2 position correspond to the decimal value 6, etc. In the operation of the analog-to-digital converter, as next described, the analog signal is converted to two significant decimal digits, it being understood that a greater or lesser number of decimal digits could be determined as required. Further, with respect to the programming of the register, it is convenient to initially set the register to a binary 1 in the 8 position of the highest order digit position, representing, in this example, a decimal value 8.0 and thereafter program the register, at the conclusion of each comparison step, to activate the next significant binary digit in the highest order decimal digit in the register to the one condition, progressively following this sequence so that four comparisons per decimal digit are necessary to obtain the digital representation of the analog function. Moreover, a positive error signal on line 42 resets the binary digit being compared to zero as a result of the known analog feedback voltage being greater than the analog input signal and a negative error signal on line 44, in conjunction with logic circuit 46, permits the binary digit to remain on as will be better understood at the end of the example next described.

At the start of a comparison cycle, digital register 50 is set to a 1 in the highest order of the binary stages representing the most significant decimal digit. By way of example, referring now to FIG. 4, which indicates a digital register capable of storing digit values between 0 and 9.9, it is seen that initially the register is set to one in the 8 position of the unit decimal figure, the remaining binary values being reset to the 0 state. Assuming the analog input signal connected to terminals 10 and 12 of FIG. 1 corresponds to a digital value of 5.2 millivolts, the digital value in register 50, corresponding to a decimal value of 8.0, is converted by the digital analog converter 58 to a D.C. analog voltage and proportioned to 8.0 millivolts in range select network 24. This voltage is next employed to charge capacitor 22. Capacitor 22, charged to an analog potential corresponding to the decimal value of 8.0, is next switched in series with the analog input signal by chopper 18. Since at this time, the analog signal corresponding to 8.0 is greater than the digital value represented by the analog signal applied to input terminals 10 and 12, which in this example is 5.2, a positive pulse of current is directed through primary winding 16 of transformer 14. This positive pulse of current is coupled by secondary winding 36 to pulse amplifier 38, and thereafter to level detector 40. Level detector 40 detects this positive error signal and energizes line 42. Referring again to FIG. 2, as well as the above brief description with reference thereto, it should be understood that even if pulse amplifier 38 is overloaded under this condition, the negative overshoot occurring later in time than the positive error signal on line 42 has no effect on the operation of the decision logic circuit 46. The positive error signal directed to decision logic circuit 46, develops an output signal on line 156, coupled to digital register 50, to indicate that the initial trial voltage is too high. This output on line 156 is effective at this time to reset the flip-flop representing the 8 value of the unit decimal figure to the 0 condition. Shortly thereafter the flip-flop, representing the 4 value of the unit decimal figure, is turned to the 1 condition indicating a value of 4.0 now stored in register 50. Next, this decimal value is again converted by digital-to-analog converter 58 into an analog voltage to charge capacitor 22 to the analog value representing digital value 4.0. Next, chopper 18 again connects capacitor 22 in series with input terminals 10 and 12, and at this time a negative current pulse flows through primary winding 16, since the comparison analog signal voltage, representative of digital 4.0 is less than the unknown analog input signal of 5.2 in this example. This negative signal is again amplified in amplifier 38 and detected in level detector 40 which generates a negative error signal coupled along line 44 to decision logic circuit 46. The negative error signal on line 44 is effective to prevent logic circuit 46 from generating any output manifestation on line 156. Thus, the register retains the binary flip-flop representing the 4 value binary bit of the unit digit in the 1 condition. Again, thereafter, the next lower order binary bit is switched to the one condition, that is, the binary value 2 of the unit digit, so that register 50 is now storing the digital value 6.0. Upon conversion of this value to analog form and comparison with the unknown analog input, the comparison produces a positive pulse in primary winding 16, since this value is greater than the unknown analog input. This positive signal, amplified, detected, and applied to logic circuit 46 again produces an output manifestation on line 156 effective to switch the 2 binary representative bit of the unit digit of the register to the 0 condition and next the binary 1 flip-flop is switched to the 1 condition. Now, with the binary flip-flops of register 50 set to 1 in the 4 and 1 positions of the unit decimal digit of register 50, indicative of a decimal value of 5.0, this degital value is again converted to an analog voltage, which is compared by capacitor 22 with the unknown analog input signal. Since at this time, the known analog reference signal is less than the applied analog unknown signal, a negative pulse indication is obtained which, amplified by amplifier 38 and detected by level detector 40, produces a negative error indication on line 44. Energization of line 44 is effective to inhibit logic circuit 46 from producing an output manifestation along line 156. Thus the 1 in the binary unit position of the decimal unit value remains in the ON condition, and, thereafter, the binary 1 in the 8 position of the decimal tenths digit is turned on, corresponding to a decimal value of 5.8. The analog representation of this decimal value, upon being compared in the manner above described, generates a positive pulse through primary winding 16 of transformer 14. This pulse is effective to actuate logic circuit 46, along line 42 to produce an output along line 156 which, at this time, turns the binary trigger, representing the 8 of the tenths decimal unit, to the OFF condition in register 50. Again, thereafter, the binary flip-flop representing the 4 value of the tenths decimal digit is turned to the ON condition, indicating a decimal value of 5.4. The analog representation of this value is again effective to generate a positive pulse, through winding 16 of transformer 14, which applied to logic circuit 46 along line 42, energizes line 156, coupled to register 50, to turn the 4 valued flip-flop of the decimal tenths position to the OFF condition. Again, thereafter, the 2 valued flip-flop of the decimal tenths position is turned on corresponding to a value of 5.2. The analog representation of this digital value being equal to the analog input supplied to terminals 10 and 12 produces no error signal. Under this condition, line 156 remains de-energized and the 2 value flip-flop in the tenths decimal register remains in the ON condition. Again, thereafter, with the 2 value flip-flop remaining in the ON condition, the flip-flop in the 1 position of this digital value is switched to the ON condition resulting in a digital value of 5.3 being set in register 50. Again the analog representation of this value is compared with the unknown analog input, and, since 5.3 is greater than 5.2, a positive pulse is generated, which applied to logic circuit 46 energizes line 156 to reset the 1 valued flip-flop in the least significant digital value to the 0 condition. Since in the example as shown, wherein register 50 contains only 2 digital significant figures, the end of 8 comparison steps is sufficient to indicate the conversion is complete. Although register 50 indicates a value of 5.2 in this example when the applied input signal also corresponds to a value of 5.2, it should be understood that through the addition of one or more additional decimal significant figures to register 50, which are operable in the manner above described, a more accurate and precise conversion of the analog signal is performed. The two digits shown in FIG. 4, by way of example, are employed merely to illustrate one of the possible logical operations performed in the analog-to-digital converter in order to convert a voltage representative of an analog function into the digital value.

Figures 4, 5:
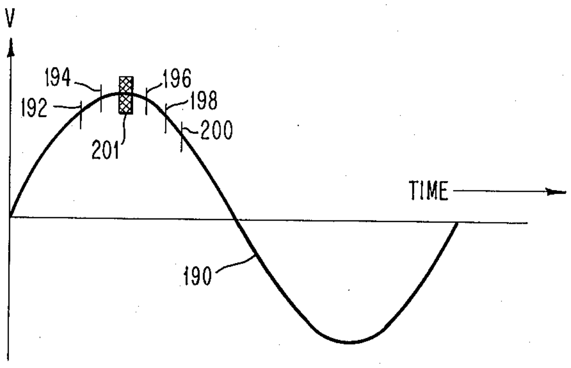
FIG. 4 illustrates a typical sequence of logical decisions in the analog-to-digital converter of the invention.
FIG. 5 illustrates selected timing intervals in the analog-to-digital converter of the invention.

In the above description of the operation of the analog-to-digital converter of the invention, it is seen that chopper 18 is effective to first charge capacitor 22 to a potential equal in value to that of the known analog voltage corresponding to the digital value set in register 50. Thereafter, chopper 18 is effective to connect charged capacitor 22 in series with the analog input signal, to generate an error signal, either positive or negative, should the known analog voltage differ from the voltage of the analog input signal. Chopper 18 shown schematically in FIG. 1 as a mechanical chopper may be, as is understood by those skilled in the art, either in fact a mechanical chopper or, alternatively, a solid state or electronic switching network. However, independent of the actual type of chopper employed it is necessary that the switching action of chopper 18 be synchronized with the logical decisions performed in the remainder of the analog-to-digital converter. To accomplish this synchronization, as well as to synchronize the various logical operations performed within the converter, a time base generator indicated as block 90 in FIG. 1 is employed from which is generated the necessary timing and synchronization waveforms. Generally, generator 90 operates at a frequency very much higher than the frequency at which the logical decisions are performed which is the same as the frequency applied to chopper 18. Generator 90 may be any of the well known stable oscillator circuits or an astable multivibrator. The output of generator 90 is coupled through line 92 to time interval generator 94, and also coupled to modulator 62 and demodulator 72. Generator 94 is effective to divide the frequencies applied by line 92 in various steps to provide a relatively low frequency driving waveform for chopper 18. Further, a group of timing signals integrally related with the waveform supplied by line 92 are also generated, a few of which are indicated in the waveform shown in FIG. 5. FIG. 5 illustrates in curve 190 a single cycle of the waveform applied to the drive line of chopper 18. Superimposed upon this waveform are indicated a group of five timing pulses indicated as 192 through 200. Further a shaded portion superimposed on sine wave 190, illustrated by reference numeral 201, indicates the time of closure of switching contact 26 of chopper 18 on contact 20. That is, this is the time the known analog signal is connected in series with the unknown analog signal. The timing impulses of FIG. 5, indicated by reference numerals 192 through 200, are supplied to lines 96 through 104 at the output of the time interval generator 94 and coupled to time sequencer 110. Sequencer 110, together with a conversion start signal applied along a line 202, is effective to deliver an output manifestation along line 112 to indicate that a conversion cycle of operations has begun. The start signal applied along line 202 is properly interlocked by sequencer 110 to prevent a new conversion cycle from commencing should the previous cycle not be completed. Upon completion of the cycle in progress, the signal is then effective to commence the next cycle, and line 112 is energized. Timing signal 194 on line 98 is coupled along line 132 to logic circuit 46. This pulse occurs in time before switching contact 26 of chopper 18 transfers to contact 20 to apply the known analog reference signal in series with the analog input signal. Pulse 194 on line 132 is effective within logic circuit 46 to condition trigger circuit 140 to the OFF state and open gate 146 (see FIG. 2). Further, this signal also resets trigger circuit 152. Timing pulse 196 available on line 100 is additionally supplied to logic circuit 46 along line 130. This pulse occurs in time after switching contact 26 of chopper 18 transfers to contact 20 and opens gate 148 of logic circuit 46 (see FIG. 2) to permit the positive error signal, if any, to reset register 50.

As described above, register 50 is progressively stepped from the highest order binary bit in the highest order digital unit to the lowest order binary bit of the least significant digital figure, independent of whether or not a positive or negative error signal is supplied to logic circuit 46. Further, should a positive error signal be supplied to logic circuit 46, a positive signal is coupled along line 156 to digital register 50, to reset the particular binary bit being compared during the particular cycle of operation. The particular register conditioning pulses necessary during a conversion cycle are supplied along a line 204 to register 50 to both condition the binary digit being compared to be reset by a signal appearing on line 156, if any, and to condition the next binary bit to be set to the ON state by a pulse supplied to register 50 along a line 209. These pulses are timed by counter 116 coupled to sequencer 110 by line 96, the output of which is fed to decoder 126 along line 128. Decoder 126 then conditions register 50 for reset and set operations synchronously with timing pulse 192 (see FIG. 5) prior to each comparison operation. Next, line 156 is energized synchronously with timing pulse 196, and the set pulse delivered to register 50 along line 209 is timed in conjunction with timing pulse 198. Referring to the sequence of operations in FIG. 4, which includes only 2 digit values requiring 8 comparison operations, an output pulse is also supplied by decoder 126 at the beginning of the eighth comparison cycle along line 118 to gate 114. Gate 114 is essentially an AND circuit which is energized by line 118 immediately before the last conversion operation is performed. Further, gate 114 is also energized along a line 206 by time sequencer 110 during the entire conversion cycle, and, finally, by each timing pulse 196 along line 120. In this manner, gate 114 delivers an output manifestation to line 122 at the end of a conversion cycle through the summation of the signal on line 206 indicating a conversion cycle has started, the signal on line 118 indicating the last comparison operation has begun, and the signal on line 120 indicating the end of a comparison operation.

Further, the conversion finished signal on line 122 is also coupled back, along a line 208, through a delay network 210 to the automatic conversion start terminal 212A. Thus, with the automatic manual conversion start switch 214 in the automatic position, the next conversion cycle is initiated a short time after a conversion finished indication is obtained, this time being determined by the amount of time delay in network 210. Alternately, an input pulse can be supplied to the manual terminal 216A of this switch to initiate a conversion cycle. However, in view of the complex logical decisions being performed, this conversion start signal is interlocked by time sequencer 110 to prevent the start of a conversion cycle should a previous conversion cycle not be completed. A test position 215A is also provided by automatic manual conversion start switch 214. In this position, the logic and timing circuits are modified so that each comparison cycle is controlled individually in response to signals coupled to test terminal 215A.

Referring now to FIG. 1, it should be noted that polarity indications are attached to input terminals 10 and 12, such that terminal 12 is shown as receiving the positive analog input. Generally, only one polarity of analog signals is usually required in large scale information handling systems. However, through a minor modification of the logic of the converter shown in FIG. 1, bipolar signals can be applied to terminals 10 and 12. This is accomplished by adding one comparison cycle to the sequence of operations and further adapting sequencer 110 to reset register 50 along a line 209 to the 0 condition in all of the binary bits of each digit figure. The first comparison, thereafter, generates either a positive or a negative error indication. A negative error signal is effective to indicate that the magnitude of the voltage fed back to capacitor 22 from register 50 is less than the magnitude of the input signal applied between terminals 10 and 12, or otherwise stated, a positive signal is coupled to terminals 10 and 12 as shown in FIG. 1. Next, the highest order binary bit of the most significant digital digit is set to the ON condition and the conversion cycle as described above continues. A positive error signal is effective to indicate that the magnitude of the voltage fed back to capacitor 22 from register 50 is greater than the magnitude of the input signal applied between terminals 10 and 12. Since a zero voltage was fed back, the analog input signal is negative. Under this condition, the demodulator drive signal applied to demodulator 72 is reversed 180° in phase, changing the polarity of the D.C. comparison signal and again the conversion cycle as described above continues. Referring now to FIGS. 1 and 2, during this polarity comparison operation, sequencer 110 first applies a signal to logic circuit 46 along a line 222. This signal is effective to inhibit gate 148 of logic circuit 46 to prevent line 156 from being energized, and is then fed to a sign test circuit 260 along a bipolar test line 262. Next, the receipt of a positive error signal, by itself or immediately prior to a negative error signal, passes through open gate 146 of logic circuit 46 and thence along a line 264 to sign test circuit 260. Coincidence of these two signals applied to circuit 260 generates an output which sets a trigger circuit 268 to actuate a phase inverter within demodulator 72. Alternatively, the output of trigger circuit 268 could likewise cause a 180° phase reversal in the drive signal applied to modulator 62. Thereafter a conversion finish signal resets trigger 268. It should be also be noted that when various of the input signals applied to the converter are known to be negative, a zero offset voltage can be introduced in series with the input lines, which is effective to add a known magnitude of voltage in series with the analog input to convert the negative input waveform to positive potential.

There are often appreciable levels of common mode voltages present superimposed upon the low level analog signals representative of temperatures, pressures, and liquid flows, especially in those installations where the measurement transducers are located remote from the analog-to-digital converter. These common mode voltages, which may be either A.C. or D.C. derive their name from the fact that they are common to each of the input lines. The signal voltages are called normal mode voltages. The common mode voltages may be the result of differences in ground potential between the analog-to-digital converter and the measurement transducer, they may result from extraneous pick up, and/or may be inherent in the design of the transducer itself. To accomplish analog-to-digital conversion with a high degree of accuracy in the presence of appreciable amounts of common mode voltages the converter must be capable of inhibiting the conversion of these common mode voltages to normal mode voltages, while converting the normal mode voltages to the corresponding digital value. By way of example, although differential input measuring devices are designed to reject common mode voltages, input signal line impedances together with the possibility of unbalanced resistance leakage to ground or stray capacitances to ground, each cause some of the common mode voltages to be converted to normal mode voltage thus distorting the effective magnitude of the input signal. The analog-to-digital converter of the invention, as described above, has been designed with the low signal portion of the chassis floating with respect to ground in order to maintain any leakage resistance greater than 2000 megohms. Further, the effective capacitive coupling to ground is maintained at a minimum through a pair of double shields 34 and 35, insulated one from the other, each of which is individually connected to separate electrostatic shields of transformers 14 and 66. Additionally, a third electrostatic shield of these transformers is maintained at system ground as indicated in FIG. 1. Further, through the novel comparison means described above, which effectively maintains lines 10 and 12 open circuited even during a comparison operation, common mode signals resulting from signal line impedances are additionally minimized.

Further note should be made of the fact that the converter of the invention is readily adaptable for control by an associated computer. Such a computer would first adjust range select network 24, then select a polarity sign test comparison operation or zero offset selection, depending on instructions stored in memory. Next, a conversion start signal is supplied by the computer and a conversion finish signal delivered to the computer, the computer thereafter reading out the contents of register 50 as desired.

It should also be noted that in the above detailed conversion cycle employing an 8, 4, 2, 1 code, it is possible to prevent invalid codes, that is a decimal digit value in excess of 9, from being generated. This is accomplished by providing that the 8 binary value in each decimal digit, except the most significant, when remaining in the ON condition after its comparison operation, thereafter interlock the 4 and 2 representative binary bits, so that line 209 is ineffective to set these bits to the ON condition. In this manner, decimal digit values greater than 9 cannot be generated in the lower order places. However, in the highest order decimal digit, this interlock feature is only applicable to the 4 valued binary bit upon a comparison operation indicating that the comparison value is less than the analog signal. Additionally, should the 2 valued binary bit remain in the ON condition after its comparison value, the combination of 8 and 2 simultaneously being in the ON condition indicates an overload condition due either to range select network 24 being improperly adjusted or, alternatively, an improper logic decision.

While the invention has been particularly shown and described with reference to a preferred embodiment thereof, it will be understood by those skilled in the art that various changes in form and details may be made therein without departing from the spirit and scope of the invention.

What is claimed is:

1. An analog-to-digital conversion system comprising; a pair of input terminals; means coupling an analog signal voltage to said pair of input terminals; a register for storing digital data; means coupled to said register for converting said stored digital data to a D.C. voltage; a capacitor; means selectively operable to alternately connect said capacitor first in parallel with said D.C. voltage to charge said capacitor to the potential of said D.C. voltage and then in series with said input terminals; and means responsive to the difference between said analog signal and the potential of said charged capacitor for altering the digital data stored in said register, whereby said digital data is adjusted to equal in value the magnitude of said analog signal.

2. An analog-to-digital conversion system operable to accept an analog input signal and derive a digital representation thereof, comprising; a pair of terminals; means coupling said analog signal to said pair of terminals; a register for storing digital data; means coupled to said register for generating a voltage proportional to said stored data; a capacitor; means selectively operable to alternately connect said capacitor first in parallel with said voltage to charge said capacitor to the potential of said voltage and then in series with said analog signal; means responsive to the difference between the magnitude of said analog signal and the magnitude of said potential for generating an error signal; said error signal exhibiting a first polarity when said potential is greater than said analog signal and exhibiting a second polarity when said analog signal is greater than said potential; and further means responsive to said error signal for modifying the value of digital data stored in said register, whereby the value of said data is progressively modified to correspond to the magnitude of said analog signal.

3. The system of claim 2 wherein said further means includes means to decrease the value of data stored in said register a first predetermined amount during a first time interval when said error signal is of said first polarity and to increase the value of data stored in said register a second predetermined amount during a second time interval independently of the polarity of said error signal; said first predetermined amount being greater than said second predetermined amount.

4. The system of claim 3 wherein said register stores data in binary coded decimal form and said decrease in value a first predetermined amount corresponds to resetting a particular binary bit to the zero state and said increase in value a second predetermined amount corresponds to setting the next lower valued binary bit adjacent said particular binary bit to the one state.

5. An analog-to-digital conversion system operable to generate the digital representation of a millivolt analog signal without amplifying said analog signal, comprising; means coupling said millivolt analog signal to a pair of open circuited terminals; a capacitor; an adjustable voltage source; said source including a digital register and means for generating a voltage proportional to the digital value stored in said register; a plurality of comparison operations each effective to first connect said capacitor in parallel with said voltage source to charge said capacitor to the potential thereof and then in series with said analog signal; means responsive to the difference between the magnitude of said potential and the magnitude of said analog signal when said capacitor is connected in series with said signal to decrease the magnitude of said difference; and means terminating said plurality of comparison operations when the magnitudes of said potential and said analog signal differ less than a predetermined amount.

6. An analog-to-digital conversion system operable to generate the digital value of a millivolt analog signal comprising; a pair of normally open circuited input terminals; means coupling said millivolt analog signal to said terminals; a register for storing digital data; means coupled to said register to generate a voltage proportional to said stored digital data; a capacitor; means selectively operable in response to a timing signal to alternately connect said capacitor first in parallel with said voltage to charge said capacitor to the potential thereof and then in parallel with said pair of input terminals; means generating an error signal when said capacitor is selectively connected in parallel with said input terminals the magnitude and polarity of which are proportional to the difference in magnitude between said potential and said analog signal; said error signal exhibiting a first polarity when said potential is greater than said signal and exhibiting a second polarity when said potential is less than said signal; means amplifying said error signal; and further means responsive to said error signal and said timing signal to correct the data stored in said register to reduce the difference in magnitude between said potential and said analog signal.

7. The system of claim 6 including means coupling error signals only of said first polarity to said register, said last named means in combination with said further means effective to decrease the digital value stored in said register.

8. The system of claim 7 including means inhibiting overshoot signals of first polarity resulting from amplified error signals of said second polarity from decreasing the digital value stored in said register, said last named means including means responsive to said error signal of second polarity effective to deactivate said coupling means.

9. The system of claim 8 including means responsive to said timing signal for controlling the operation of said inhibiting means.

10. The system of claim 6 wherein said pair of input terminals, said capacitor and said voltage are independent of and shielded from a system reference potential.

11. In an analog-to-digital converter for generating digital manifestations indicative of the value of an analog voltage signal impressed on a pair of input terminals, and having a register for storing digital values, a reference voltage generator operable under control of said register for generating reference voltage proportional to the value of the digits stored in said register, comparing means for comparing the magnitudes of said reference voltage and said analog voltage and producing a control signal indicative of the relative magnitudes thereof, and means under the control of the control signal produced by said comparing means for controllably altering the setting of the digital values stored in said register to cause said reference voltage to seek equality with said analog signal;

that improvement comprising:

(a) a capacitor, (b) switching means having a first and a second state of operation, and operable in said first state of operation to connect said capacitor in circuit with said reference voltage generator to be charged thereby to the level of said reference voltage, and operable in said second state of operation to connect said capacitor in circuit with said pair of input terminals and said comparing device to compare the charge on the said capacitor with the said analog output, and (c) means for synchronizing the operation of said switching means with the means for controllably altering the setting of the values stored in said digital register.

12. In an analog-to-digital converter operative to produce a reference voltage controlled by the digital value stored in a digital register and alter the digital value stored in the register to cause the reference voltage to seek equality with an input analog signal applied to a pair of input terminals, an improved apparatus for detecting the relative magnitudes of the analog input signal and the reference voltage comprising:

(a) a modulator operable responsive to the magnitude of the said reference voltage to produce a sinusoidally varying voltage having an amplitude proportional to said reference voltage;

(b) a demodulator operable to produce a direct current voltage having a magnitude proportional to the amplitude of a sinusoidally varying input voltage;

(c) a transformer coupling said modulator and said demodulator;

(d) a capacitor, (e) means operatively connecting said demodulator to said capacitor and to one of said input terminals, (f) a switching device operable to direct the flow of current from single input to two output paths in alternate succession, the said input path being connected to said capacitor and one of said output paths being operatively connected to said demodulator, and (g) a transformed having a primary winding and a secondary winding the primary winding being connected between the second of said pair of input terminals and the remaining one of the output paths of said switching device, and the secondary thereof being connected to instrumentalities for controlling the digital value stored in said register.

References Cited by the Examiner

UNITED STATES PATENTS

| | | | |
|---|---|---|---|
| 2,979,708 | 4/61 | Jorgensen | 340—347 |
| 2,989,741 | 6/61 | Gordon et al. | 340—347 |
| 2,997,704 | 8/61 | Gordon et al. | 340—347 |
| 3,021,517 | 2/62 | Kaenel. | |
| 3,142,834 | 7/64 | Falk et al. | 340—347 |

MALCOLM A. MORRISON, *Primary Examiner.*